Aug. 12, 1952 M. S. DE LAY 2,606,769
LOAD EQUALIZING DEVICE
Filed Sept. 27, 1951
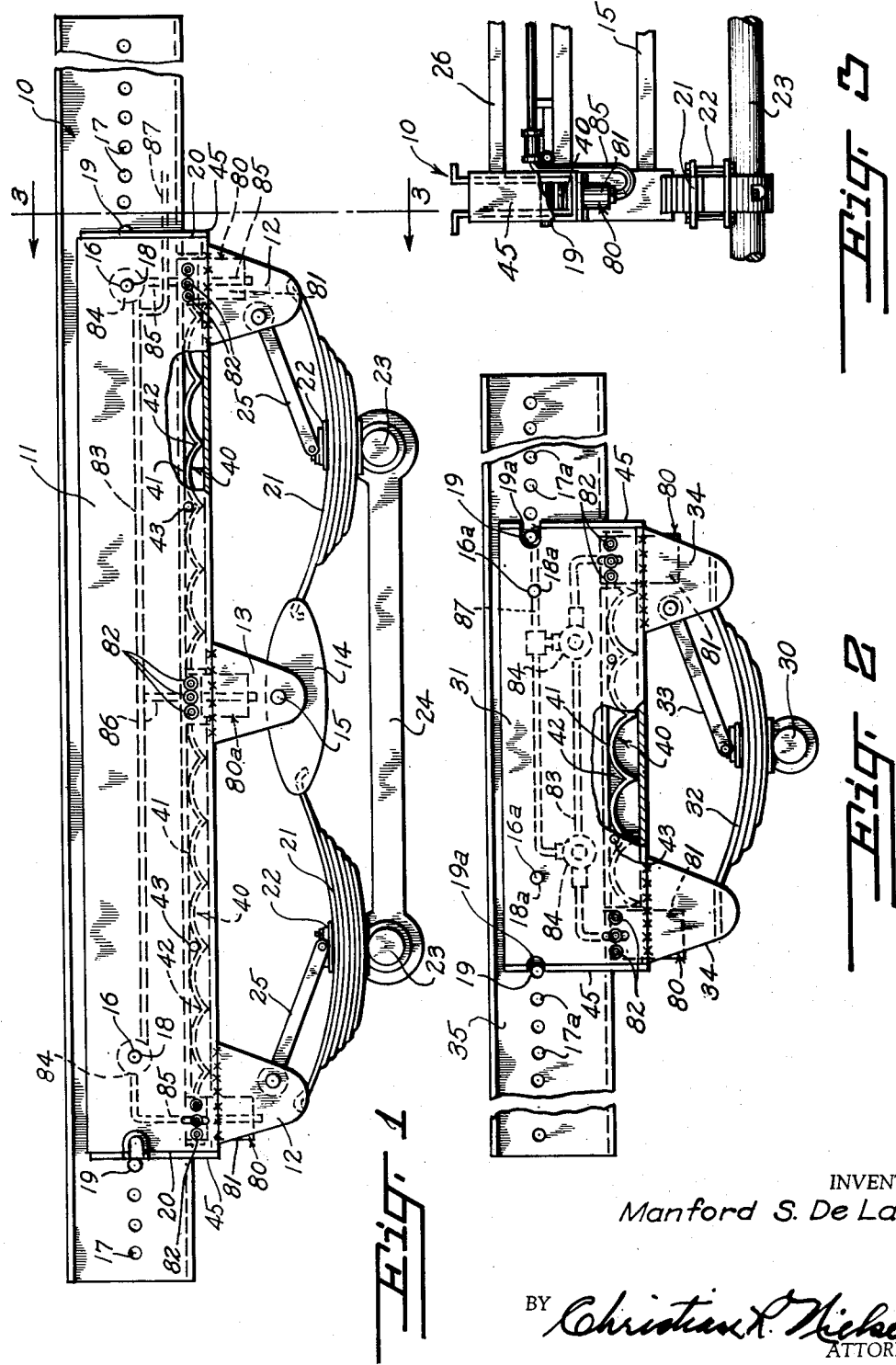
INVENTOR
Manford S. De Lay
BY Christian R. Nielsen
ATTORNEY Patented Aug. 12, 1952

2,606,769

UNITED STATES PATENT OFFICE 2,606,769

LOAD EQUALIZING DEVICE

Manford S. De Lay, St. Louis, Mo.

Application September 27, 1951, Serial No. 248,619

2 Claims. (Cl. 280—34)

This invention relates to load equalizing devices for trailers and is more particularly directed to an improvement of my load equalizing device described and claimed in my pending application filed December 14, 1950, Serial Number 200,829, now Patent #2,589,678, issued March 18, 1952.

An object of the invention is the provision of an instrumentality for permitting the trailer load to be shifted relative to a supporting carriage without the use of power operated lifts when lighter loads are carried by the trailer.

Another object of the invention is the provision of an instrumentality for permitting the trailer load to be shifted to different axles as desired without employing power operated lifts except on extremely heavy loads, said instrumentality forming greased seats for longitudinal beams of the trailer and carried by the supporting carriage, said seats being so constructed that they will have spaced contacts for the bottoms of the beams for reducing friction between the contacting parts.

A further object of the invention is the provision of corrugated seats disposed between channel members of a supporting carriage and beams of the trailer, and secured to the inner faces of the bight portions of the channel members so that beams may slide on the convex faces of the corrugations, the depressions between the convex faces being supplied with grease to permit ready shifting of the trailer body to different axles, except on extremely heavy loads when power operated lifts are employed.

This invention is best understood from a consideration of the following detailed description taken in conjunction with the accompanying drawing forming a part of the specification, nevertheless, it must be borne in mind that the invention is not confined to the disclosure but is susceptible of such changes and modifications as shall define no material departure from the salient features of the invention, as expressed in the appended claims.

In the drawings—

Figure 1 is a longitudinal side view in elevation of the auxiliary frame supported by dual axles and adapted to be adjusted longitudinally on the main frame of a trailer.

Figure 2 is a similar longitudinal side view of the auxiliary and main frame in which a single axle is employed, and Figure 3 is a transverse vertical section taken along the line 3—3 of Figure 1.

Referring more particularly to the drawing, it will be seen that my improvement is applied between each parallel U-beam 10 forming part of the main frame of a trailer body and a channel member 11 forming part of an auxiliary frame which carries the load equalizer defined and claimed in my above entitled application. Each beam 11 is nested in a respective channel member and is provided with a pair of spaced depending hangers 12 at each end. A third pair of spaced hangers 13 is placed intermediate the ends of the channel members with a dual axle evener 14 pivoted on a rod 15 carried by the hangers 13.

Pins 16 adjacent each end of the channel members are received by aligned openings 17 and 18 in the respective beams 10 and channel members 11 for retaining said members normally against shifting on said beams. Stop pins 19 received by the openings 17 engage the end edges 20 of the side walls of the channel members for positioning the U beams 10 relative to the channel members when the load is shifted. These pins also aid in aligning the openings 17 and 18 for the insertion of the retaining pins 16.

Springs 21 are clamped at 22 to axles 23 which in turn are connected together by a tongue 24. The ends of said springs are attached to the hangers 12, while the inner ends of the springs are connected to the opposite ends of the rockable member 14. Torque arms 25 have pivotal connection between the clamps 22 and the ends of the hangers 12. The pairs of spaced hangers 12 and 13 may be reinforced by plates welded at the edges to side edges of the hangers. The channel members at each side of the trailer are connected together by transverse bars as indicated at 26 in Figure 3. The rod 15 while acting as a pivot for the rockable bars 14 also joins the members 11 together.

Figure 2 illustrates a load equalizer when a single axle 30 is employed and therefore, the torque rod 24, the rockable bar 14, the hangers 13 and one of the leaf springs are eliminated. Thus, the channel members 31 of the auxiliary frame is connected to the axle 30 by the spring 32 and the torque arm 33 through the intermediary of the depending spaced hangers 34 to receive the U beams 35.

Lifts 80 (Figure 1) are secured in any approved manner in the hangers 12, while lifts 80ª are secured in the pairs of hangers 13 at each side of the trailer. The lifts, as usual, include a cylinder 81 in which is mounted a piston (not shown) carrying rollers 82 at the upper end for engagement with the bottom or bight portion of the U beams 10 when the pistons are elevated by fluid under pressure, for raising the beams and the attached trailer. The pistons move through openings in the bottom of the channel members 11.

Longitudinally disposed pipes 83 have the ends thereof in communication with the adjacent ends of cylinders 84 which are disposed transversely between the beams 10. Pipes 85 connect the cylinders 84 with the bottoms of the cylinders 80. A pipe 86 connects the pipe 83 with the bottom of the cylinder 80ª. A pipe 87 supplies fluid to the pipe 83.

In the modified form shown in Figure 2, the intermediate cylinder 80ª of Figure 1 is eliminated together with the necessary attachments. However, the pipe 87 for supplying fluid under pressure to the cylinder 84 and the interconnecting pipe 83 for said cylinder together with the lifts 80 are provided for raising the beams 35.

The beams 35 have the passages 17ª which are adapted to be aligned with the passages 18ª in the channel members 31 for the reception of the pins 16ª for retaining the beams from shifting in the channel members. The stop pins 19 are inserted into the passages 17ª to not only position the beams relative to the channel members but to align the openings 17ª and 18ª for the application of the pins 16ª. The pins 19 are received in notches 19ª at the ends of the channel members.

Corrugated seats 40 for supporting the bight portions of the beams 10 when the load is shifted from one axle to another, are carried by the channel members and have the ends thereof welded to said members. The outer faces 41 of the convex portions of the corrugated seats have restricted contacts with the under faces of the beams 10. Grease is supplied to the spaced depressions 42 in the seats by spaced cups 43 of the usual type, mounted in the outer walls of the channel members 11. The grease causes the beams 11 to slide freely on the convex portions of the corrugated seats when the pins 16 have been removed, the load is shifted to a different axle. It will be noted that one seat 40 is employed in the modified construction shown in Figure 2, while two seats are used in Figure 1. Felt pads 45 are fixed in place between the ends of the channel members and the side walls of the nested beams to prevent the loss of grease and the entrance of foreign matter.

When heavy loads are carried by the trailers, fluid under pressure is supplied to the cylinders for operating the lifts. For lighter loads, however, the beams 10 and the channel members 11 may be shifted on the greased seats 40 relative to each other. It is to be borne in mind that in both forms, while only one beam 10 and a single channel member 11 are illustrated pairs of parallel beams and channel members are employed.

I claim:

1. In a load equalizer for supporting carriages of trailers having attached parallel longitudinal beams, a supporting carriage for the trailer having longitudinal parallel channel members receiving the beams, a corrugated metal seat having the ends thereof welded to each channel member, the beams resting on said seats and having spaced contact with the seats and means for supplying lubricant to the seats.

2. In a load equalizer for the supporting carriages of trailers having attached parallel longitudinal beams, a supporting carriage for the trailer having longitudinal parallel channel members receiving the beams, a metal strip secured rigidly to the interior of the channel members and provided with alternately disposed depressions and convex surfaces, the beams resting on the convex surfaces to provide limited contact between the beams and metal strips to facilitate the shifting of the trailer load to different axles when desired, means for filling the depressions with lubricant, and means removably connecting the beams and channel members together.

MANFORD S. DE LAY.

REFERENCES CITED

The following references are of record in the file of this patent:

UNITED STATES PATENTS

| Number | Name | Date |
| --- | --- | --- |
| 1,327,895 | Apostoloff | Jan. 13, 1920 |
| 1,621,555 | Miller | Mar. 22, 1927 |
| 2,197,401 | Weber | Apr. 16, 1940 |
| 2,332,326 | Lex | Oct. 19, 1943 |